United States Patent [19]
Holmes

[11] 3,895,501
[45] July 22, 1975

[54] UNIVERSAL JOINT
[75] Inventor: Horace D. Holmes, Farmington Hills, Mich.
[73] Assignee: Masco Corporation, Taylor, Mich.
[22] Filed: Nov. 12, 1973
[21] Appl. No.: 414,934

[52] U.S. Cl................................. 64/8; 64/17 R; 64/23
[51] Int. Cl.............................................. F16d 3/02
[58] Field of Search............ 64/8, 7, 17 R, 17 A, 23

[56] References Cited
UNITED STATES PATENTS
| | | | |
|---|---|---|---|
| 1,966,486 | 7/1934 | Cutting | 64/8 |
| 2,117,706 | 5/1938 | Cutting | 64/7 |
| 2,386,754 | 10/1945 | Snyder | 64/8 |

FOREIGN PATENTS OR APPLICATIONS
| | | | |
|---|---|---|---|
| 1,004,768 | 9/1965 | United Kingdom | 64/8 |
| 575,787 | 10/1924 | France | 64/8 |
| 1,268,917 | 6/1961 | France | 64/8 |

*Primary Examiner*—Benjamin W. Wyche
*Assistant Examiner*—Randall Heald
*Attorney, Agent, or Firm*—Whittemore, Hulbert & Belknap

[57] ABSTRACT

A driven half of the universal joint has an axially outwardly opening tubular socket end in which an end of a driver half of the joint is slidably received; and a universal torque-transmitting coupling of shaft to socket, also accommodating axial change in position of those parts, is effected through a pair of like cushioned swivel sub-assemblies, each journaled by transverse pin and bushing means to the driver half end. The driven socket presents a specially shaped cavity defined by pairs of flat parallel, radially outwardly extending and laterally spaced wall surfaces on either side of the axis of socket rotation, between each of which surface pairs corresponding flat side surfaces of one of the swiveling and torque-transmitting sub-assemblies are received with a sliding fit. Thus said sub-assemblies act directly and torsionally on the output socket in transmitting driving power between the shaft members of the installation. Each such sub-assembly includes an annular cushioning washer of plastic presenting, radially outwardly of its flat side surfaces, a quasi-cylindrical convex surface, which arcuate surfaces have swiveling action as engaged with flat, axially extending and radially outer wall surfaces of the driven socket half. Steel sleeves encircle and confine the cushions of the respective sub-assemblies, being convexly arced flush with the outer surfaces of said cushions. Swiveling of the driver shaft and the sub-assemblies in a plane at 90° to the direction of the swivel action just described takes place about the axis of the previously described pin and bushing means on the driver shaft end.

2 Claims, 3 Drawing Figures

PATENTED JUL 22 1975 3,895,501
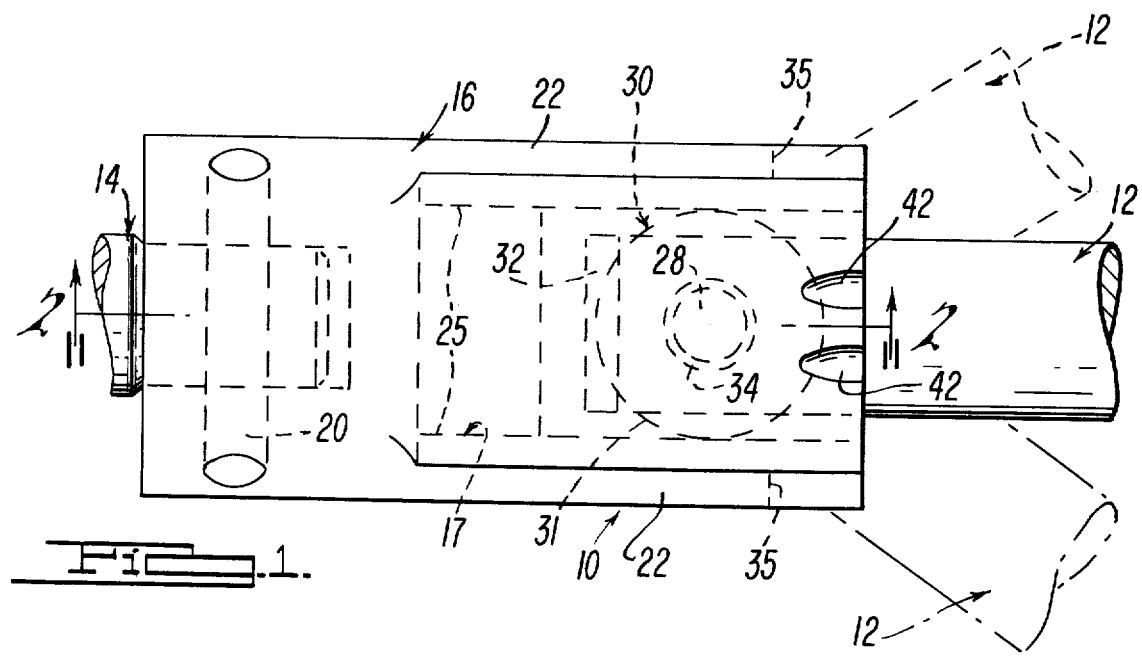
Fig. 1.
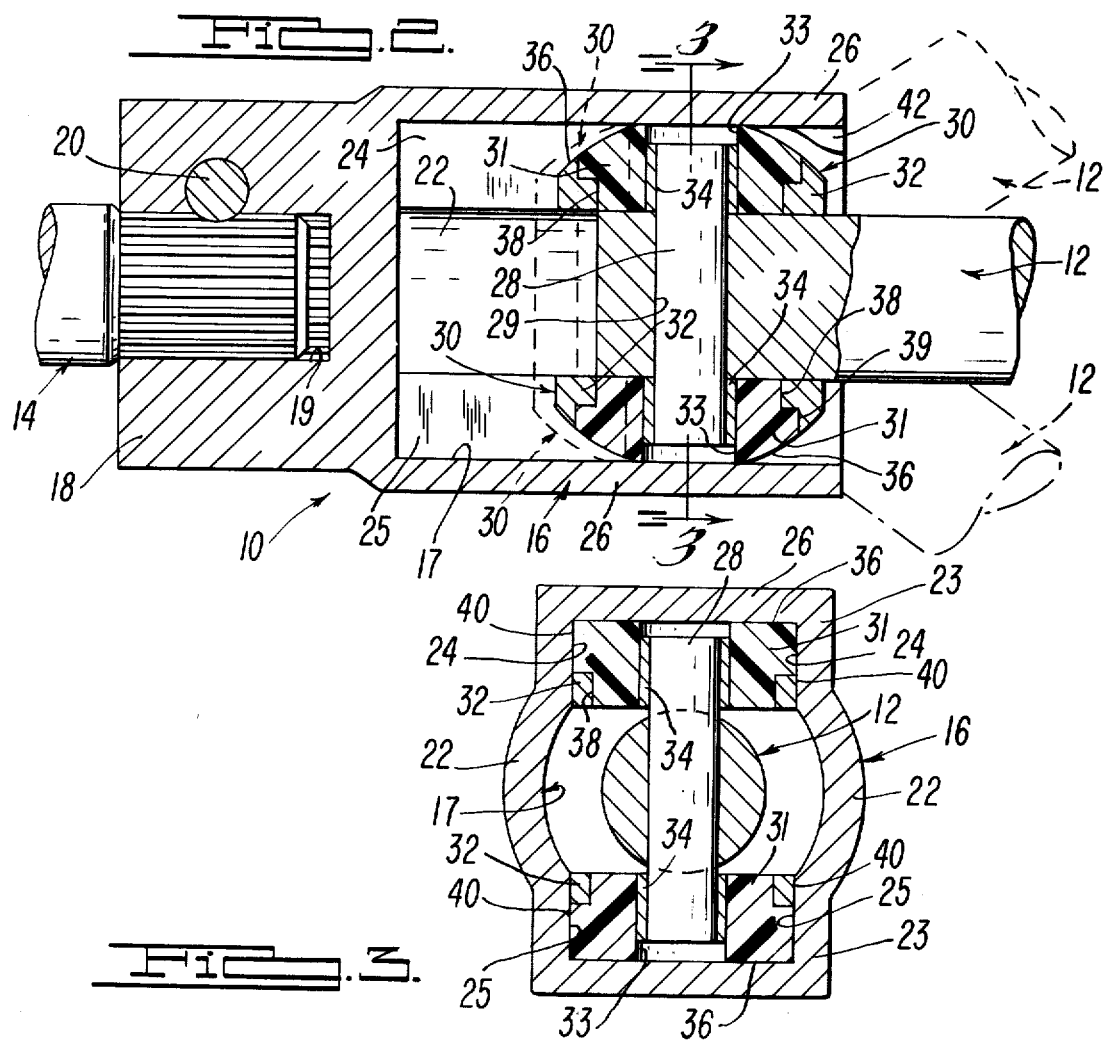
Fig. 2.
Fig. 3.

UNIVERSAL JOINT

BACKGROUND OF THE INVENTION

1. Field of the Invention

The improved joint finds application in practically any field in which the usual universal joint is employed. A typical installation will be in a relatively low speed-low torque coupling of the steering post or column of an automobile to a driven steering assembly, power-operated or otherwise. However, applications of the invention in a much wider field of out-of-line torque transmission are of course contemplated.

2. Description of the Prior Art

A search has revealed the following U.S. Pats:

| | | |
|---|---|---|
| Wildhaber | 2,752,765 | July 3, 1956 |
| Wildhaber | 2,685,784 | August 10, 1954 |
| Coleman | 2,469,713 | May 10, 1949 |
| Williams | 2,337,287 | December 21, 1943 |
| Guy | 1,840,714 | January 12, 1932 |
| Geiger | 1,577,575 | March 23, 1926 |
| Brazier | 730,604 | June 9, 1903 |

Of the foregoing, the Wildhaber patents, Brazier, Geiger and Coleman disclose universal joints or couplings in which some degree of relative axial shift between driving and driven coupling members is accommodated, while Guy and Williams show universal joints which have a cushioned action, as by interposed radial V-pads, in the transmission of driving torque. However, none of these citations shows or suggests a combination in which a pair of like composite coupling sub-assemblies have multiple functions in accommodating a wide range of out-of-line swiveling of the coupled parts, in affording a firmly cushioned positive and substantially shock-free transmission of torque between said parts, and in permitting, in an angularly swiveled relationship of said parts, a degree of relative axial shift therebetween.

SUMMARY OF THE INVENTION

The improved universal joint affords a very inexpensive substitute in part for the commonly accepted means accommodating such axial shift, i.e., the usual metal-to-metal spline or key type sliding connection as characterized by a rigid impact and shock type action under variable torque. There is substituted a cushioned, but nevertheless positive, instantaneous and loss-free transmission of torque through the agency of composite steel-clad swivel sub-assemblies of a sort entirely different from the cushion means of the abovei-dentified Guy and Williams patents. Said sub-assemblies or units have direct flat-wise side engagements with rigid walls of the socketed joint part in which they are slidably received.

Due to the slidably self-adjusting or compensating interfit the coupling is very reliable and responsive in operation regardless of rough axial tolerances frequently present in a given installation, for example due to variations in spacing of associated components. The joint also dispenses with expensive yoke or gimbal-type parts; and the large area torque-transmitting interface surface between pairs of driven half socket walls and the respective swiveling sub-assemblies represents a material improvement in point of torque-transmitting ability in small installations over prior art devices. Typical of these are the patents to Wildhaber U.S. Pat. No. 2,685,784, Brazier, Geiger and Coleman, in which actual torque is transmitted at substantially line contact through pin and roller or trunnion type means.

Brief Description of the Drawings

FIG. 1 is a fragmentary top plan view of the universal joint of the invention as typically employed in coupling an automotive steering column or shaft with another steering assembly, such as a hydraulic power-steering pump, the view at its right indicating in solid, dotted and dot-dash lines a typical range of angularities of the column and pump input axes in the out-of-line coupling thereof;

FIG. 2 is a further fragmentary view in horizontal axial section on line 2—2 of FIG. 1, also suggesting the available range of swiveling action afforded in a plane at 90° to FIG. 1, as well as showing in solid and dotted line a permissible self-adjusting relative axial shift of the coupled parts; and FIG. 3 is a view in transverse vertical section on line 3—3 of FIG. 2, this view best depicting a special cross-sectioning of the driven socket half of the joint and the swivel sub-assemblies of the latter.

DESCRIPTION OF A PREFERRED EMBODIMENT

FIGS. 1 and 2 illustrate the improved coupling or joint of the invention, as generally designated by the numeral 10, in a typical installation in which it drivingly couples an input or driving shaft member 12 to an output or driven shaft member 14 for universal action in a range of out-of-line angularities between dotted line and dot-dash line extreme positions in respect to vertical and horizontal reference planes. As indicated above, an installation among many possible will have shaft 12 represented by an automotive steering column extension, shaft 14 being an input connection from unit 10 to a power steering mechanism (not shown).

As best shown in FIGS. 2 and 3, a driven component or half of the universal coupling is a cast or forged socket 16 presenting a specially contoured end socket cavity 17 of substantial volume, and a connecting driver body member 18 integral with the socket. Said body is provided with a splined axial end bore 19 to receive a correspondingly splined end of the output shaft 14. The connection is further strengthened and insured against end shift at the splining by a transverse pin 20 which is mated with and across a groove in the shaft end.

FIG. 3 best illustrates the cross sectional contour of the cavity 17 of socket member 16. It presents medial side wall portions 22 between top and bottom side wall formations 23. Portions 22 have a rounded quasi-cylindrical girth of substantial diameter, and each pair of the opposite vertical walls 23 presents parallel, flat and transversely spaced inner wall surfaces, those of the uppermost pair being designated 24 and those of the lower pair being designated 25. Integral top and bottom wall members 26 complete the cross-sectional outline of the socket cavity 17.

The driver shaft 12 extends substantially into said cavity and carries adjacent its inner end an operating swivel pin or rod 28 which is force-fitted in a transverse opening 29 through the shaft, extending substantially and equidistantly outwardly of the shaft's cylindrical section. The pin ends carry identical composite torque transmitting and swivel sub-assemblies, generally designated by the reference numeral 30.

Each such sub-assembly comprises an annular shock-absorbing cushion 31 of circular washer-like outline, which is bounded by a steel retainer ring 32, the cushion and ring being of a special sectional contour. Cushion parts 31 are by preference molded of a suitable synthetic plastic composition having sufficient body to transmit torque under compression positively and faithfully, yet being resiliently compressible to a degree to absorb input shock upon a sudden change in angularity of the coupling or value of transmitted torque. As appears in FIGS. 2 and 3, the cushion 31 is centrally apertured at 33 to fit tightly over a steel cylindrical pivot bushing or bearing sleeve 34, which bushing in turn has a slip fit on one of the protruding ends of swivel pin 28. Through this agency each of the sub-assemblies 30 has a free swiveling action with shaft 12 about the axial centerline of pin 28, this in a wide range as depicted in solid, dotted and dot-dash line in FIG. 1. Such latitude of swing arc is increased by recessing at 35 the outer open axial end of the rounded wall components 22 of socket 16.

Further, the unit comprised of cushion member 31 and steel retainer 32 presents at the radially outer extremity of each sub-assembly 30, a composite convex bearing surface at 36 (FIG. 2), which is quasi-cylindrical on an arc centered at the midpoint of swivel pin 28. Thus, the joint 10 is capable of swiveling action to afford the second major component of its universal action, i.e., as depicted in FIG. 2 between the solid, dotted and dot-dash line positions of the driver shaft 12.

Finally, the cushion 31 of each swivel sub-assembly 30 has a radially inner, reduced diameter cylindrical neck portion at 38, where it fits into the bore of retainer ring 32, the cushion having a larger diameter shoulder 39 at which it engages radially inwardly against the ring 32.

As best appears in FIG. 3, each cushion and ring sub-assembly 30 is characterized by flat parallel and radially outwardly extending sides 40 which fit relatively tightly within the corresponding parallel and flat pairs of socket wall surfaces 24, 25. Thus, driving torque is transmitted from input shaft 12, in any position of angularity thereof relative to socket 16 and output shaft 14, to positively drive the latter. The drive is nevertheless cushioned resiliently yet solidly by the member 31.

As thus mounted in socket 16, the cushion subassemblies 30 will permit a relative axial movement of the end of shaft 12 in the socket, to the extent of, say, ⅜ inch in a typical universal joint of the invention. Undesired separation of shaft 12 and its sub-assemblies from the socket cavity 17 is prevented by a pair of dimples 42 (FIGS. 1 and 2) indented in a cross wall 26 of socket 16. These stop indentations do not interfere with a proper assembly of the swivel structure to drive shaft 12, typically in the following manner.

The swivel pin 28 is first force-fitted transversely to shaft 12; and the sub-assemblies of bushing 34, cushion 31 and retainer ring 36 are next telescoped onto the pin ends. Then, with said shaft and swivel assembly positioned as in the lower, dot-dash line shaft orientation of FIG. 2, the unit is advanced axially into the socket 16, with its parallel flat driver surfaces 40 (FIG. 3) frictionally engaged between pairs of wall surfaces 24 of the socket; and the universal joint 10 is ready for installation in any appropriate surrounding.

Parenthetically, it should be understood, in reference to what appears in FIG. 2, that the dotted line and dot-dash line outlines of the input shaft 12 represent angularities it assumes when the shaft and its sub-assemblies 30 will have been fully positioned to the right in limiting stop engagement with the dimples 42, and not as actually shown by FIG. 2 in a more leftward position.

It is of course to be understood that other types of coupling or other equipment may be interposed between joint 10 and the components drivingly coupled by the latter, here instanced without limitation as automotive steering column and the input of a power steering unit.

What is claimed is:

1. A universal joint comprising a first rotative torque-transmitting member provided with an axially outwardly opening socket, a second rotative torque transmitting member having an end received axially in said socket to act therein about a swivel axis in 90° intersecting relation to the axis of said second member, said socket being internally defined in part on opposite sides of the socket axis by pairs of rigid, transversely spaced and generally flat wall surfaces, and means drivingly connected in said socket to said second torque-transmitting member to operate about said swivel axis in transmitting torque between said members, said means including resilient cushion parts shiftable unitarily and axially with said second member relative to the socket and positively transmitting cushioned torque directly between said parts of socket wall surfaces and said second member in any position of the latter about said swivel axis, said cushion parts each including a cushion element of resiliently compressible material, said element having generally flat side surfaces slidably engaged between the respective pairs of wall surfaces of the socket and acting directly against said wall surfaces in said resiliently cushioned transmission of torque.

2. The universal joint of claim 1, further characterized in the provision of a rigid retainer element externally confining each cushion element, said rigid retainer elements partially encasing said cushion elements whereby to permit said cushion elements to act directly against said wall surfaces.

* * * * *